(12) United States Patent
An et al.

(10) Patent No.: US 9,354,732 B2
(45) Date of Patent: May 31, 2016

(54) TOUCH SCREEN DISPLAY APPARATUS HAVING IMPROVED SUPPORT FOR BOTH TOUCH SCREEN AND DISPLAY PANELS

(71) Applicant: Samsung Display Co., Ltd., Yongin, Gyeonggi-Do (KR)

(72) Inventors: Sanga An, Daejeon (KR); Yongwoo Kim, Seoul (KR); Joo Woan Cho, Asan-si (KR); In-Su Baek, Seoul (KR)

(73) Assignee: Samsung Display Co., Ltd. (KR)

( * ) Notice: Subject to any disclaimer, the term of this patent is extended or adjusted under 35 U.S.C. 154(b) by 225 days.

(21) Appl. No.: 13/969,322

(22) Filed: Aug. 16, 2013

(65) Prior Publication Data

US 2014/0253823 A1     Sep. 11, 2014

(30) Foreign Application Priority Data

Mar. 8, 2013  (KR) .................. 10-2013-0025076

(51) Int. Cl.
*G02F 1/1333* (2006.01)
*G06F 3/041* (2006.01)
*G06F 1/16* (2006.01)

(52) U.S. Cl.
CPC .......... *G06F 3/041* (2013.01); *G02F 1/133308* (2013.01); *G06F 1/1601* (2013.01); *G02F 2001/133317* (2013.01)

(58) Field of Classification Search
CPC .......... G02F 1/13338; G02F 1/133308; G02F 2001/133317; G06F 1/1601; G06F 3/0412
USPC ...................................... 349/58, 12
See application file for complete search history.

(56) References Cited

U.S. PATENT DOCUMENTS

| | | | |
|---|---|---|---|
| 6,533,428 B1* | 3/2003 | Ogo et al. ................ | 362/631 |
| 8,179,379 B2 | 5/2012 | Hwang et al. | |
| 2010/0079698 A1* | 4/2010 | Matsumoto et al. .......... | 349/58 |
| 2011/0001712 A1* | 1/2011 | Saito ......................... | 345/173 |
| 2011/0157762 A1* | 6/2011 | Kurashima .............. | G06F 3/044 361/277 |
| 2012/0231248 A1 | 9/2012 | Sato et al. | |
| 2013/0164479 A1* | 6/2013 | Lo et al. .................... | 428/53 |

FOREIGN PATENT DOCUMENTS

| | | |
|---|---|---|
| JP | 2008-145668 A | 6/2008 |
| KR | 10-2000-0014955 A | 3/2000 |
| KR | 10-2004-0041777 A | 5/2004 |
| KR | 10-2004-0056747 A | 7/2004 |

* cited by examiner

*Primary Examiner* — Thanh-Nhan P Nguyen
(74) *Attorney, Agent, or Firm* — Innovation Counsel LLP (57) ABSTRACT

A display apparatus includes a receiving container, a backlight assembly, a display panel, a touch screen assembly, a first mold frame, and a second mold frame.
The receiving container includes a bottom portion and side walls that extend from the bottom portion, and the backlight assembly is contained in the receiving container to generate light. The display panel is positioned to receive light from the backlight assembly to display an image, and the touch screen assembly is disposed on the display panel to detect a touch event occurring thereon. The first mold frame is coupled to the receiving container to support a first edge part of the display panel. In addition, the second mold frame is spaced apart from the display panel, and coupled to the first mold frame, so as to be configured to support a second edge part of the touch screen assembly.

16 Claims, 8 Drawing Sheets

TOUCH SCREEN DISPLAY APPARATUS HAVING IMPROVED SUPPORT FOR BOTH TOUCH SCREEN AND DISPLAY PANELS

CROSS-REFERENCE TO RELATED APPLICATION

This U.S. non-provisional patent application claims priority under 35 U.S.C. §119 to Korean Patent Application No. 10-2013-0025076, filed on Mar. 8, 2013, the entire contents of which are hereby incorporated by reference.

BACKGROUND

1. Field of Disclosure

The present disclosure relates generally to a display apparatus. More particularly, the present disclosure relates to a display apparatus having improved support for both touch screen and display panels.

2. Description of the Related Art

In recent years, display apparatuses employing a touch screen panel have been developed along with development of operating systems that provide a touch function, e.g., Windows® 8. To this end, such a display apparatus further includes a touch screen panel in addition to the display panel. The touch screen panel typically has a light transmitting property, and thus light exiting from the display panel transmits through the touch screen panel. The touch screen panel is disposed on the display panel to detect a touch position by a user.

Meanwhile, the touch screen panel is often made in various sizes according to customer demand and product design. Accordingly, a structure is often required to effectively and stably accommodate the display panels and the different-sized touch screen panels in the display apparatuses.

SUMMARY

The present disclosure provides a display apparatus having a structure that provides more stable support for a touch screen assembly having a size different from a display panel.

Embodiments of the inventive concept provide a display apparatus including a receiving container, a backlight assembly, a display panel, a touch screen assembly, a first mold frame, and a second mold frame.

The receiving container includes a bottom portion and side walls that extend from the bottom portion, and a backlight assembly is positioned within the receiving container and configured to generate light. The display panel is positioned to receive light from the backlight assembly so as to display an image, and the touch screen assembly is disposed on the display panel and configured to detect a touch event occurring thereon.

The first mold frame is coupled to the receiving container to support a first edge part of the display panel. In addition, the second mold frame is spaced apart from the display panel and coupled to the first mold frame so as to be configured to support a second edge part of the touch screen assembly.

The first mold frame can have at least a portion that is disposed within outer edges of the second mold frame. The second mold frame can surround outer edges of the first mold frame. Also, the second mold frame can comprise at least two sub-mold frames configured to be coupled to each other.

The first mold frame can include a first supporting part oriented substantially parallel to the first edge part, and positioned so that the first edge part is supported by the first supporting part. Also, the second mold frame can comprise a second supporting part oriented substantially parallel to the second edge part; and partition walls extending from the second supporting part. The second edge part can be supported by the second supporting part, and a height difference between the bottom portion and the second supporting part can be greater than a height difference between the bottom portion and the first supporting part.

The first mold frame can further comprise an upper end part extending from the first supporting part and oriented substantially parallel to the first edge part and the first supporting part, where the height difference between the bottom portion and the second supporting part is substantially equal to a height difference between the bottom portion and the upper end part.

The display apparatus can further include a coupling member that couples at least one of the partition walls to the first mold frame. It can also include an adhesive member disposed on the second supporting part to attach the second edge part to the second supporting part.

The display apparatus can also include a driving circuit film of which one end portion is electrically connected to the touch screen assembly so as to be configured to apply a driving signal to the touch screen assembly; and a driving circuit board facing the touch screen assembly with the receiving container interposed therebetween. The driving circuit board can be configured to generate the driving signal and further being electrically connected to the other end portion of the driving circuit film. A containing space can be defined by the partition walls and the second supporting part inside the second mold frame, and a portion of the driving circuit film can be contained in the containing space while extending through an insertion hole formed through the second supporting part.

The driving circuit film can have one end portion electrically connected to a terminal of the display panel so as to be configured to apply a driving signal to the display panel. The display can then include a driving circuit board facing the display panel with the receiving container interposed therebetween, the driving circuit configured to generate the driving signal and further being electrically connected to the other end portion of the driving circuit film. A containing space can be defined by the partition walls and the second supporting part inside the second mold frame, and a portion of the driving circuit film can be contained in the containing space while extending through an insertion hole formed through the second supporting part.

Also, the driving circuit film can extend from the display panel to the driving circuit board while extending through a space between the first mold frame and the second mold frame.

The second mold frame can further comprise a step difference part disposed on the second supporting part to face a side surface of the second edge part.

The touch screen assembly can include a touch screen panel disposed on the display panel; and an adhesive layer disposed between the touch screen panel and the display panel to attach the touch screen panel to the display panel. The touch screen panel can have a size greater than the display panel, and an area of the touch screen panel that extends beyond an edge of the display panel can be supported by the second supporting part.

Also included can be a covering member disposed on the touch screen panel and facing the display panel with the touch screen panel interposed therebetween, so that the covering member covers the touch screen panel. The covering member can have a size greater than the display panel and the touch screen panel, and an area of the covering member that extends beyond edges of the display panel and the touch screen panel can be supported by the second supporting part.

The first edge part can be exposed to an exterior of the display apparatus. The first mold frame and the second mold frame can be portions of a single unitary structure.

According to the above, the edge part of the display panel is supported by the first mold frame, and the edge part of the touch screen assembly is supported by the second mold frame which can be arranged substantially in parallel with the first mold frame. The two mold frames are configured so that upper surfaces of each respectively support the display panel and touch screen assembly. Thus, although the size of the touch screen assembly is different in size (i.e. upper surface area) from that of the display panel, the touch screen assembly may be relatively easily mounted on the display apparatus by the second mold frame, so that the display apparatus may have a more optimized structure related to specification of the touch screen assembly and customer's demand. That is, the display apparatus may more readily hold a touch screen assembly that is of any desired size, rather than being configured only to hold certain sizes of touch screen assembly, such as one that is of the same size as the display panel.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. The various Figures are not necessarily to scale. The invention contemplates any combination and/or permutation of any of the various features described in the embodiments herein.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 1:
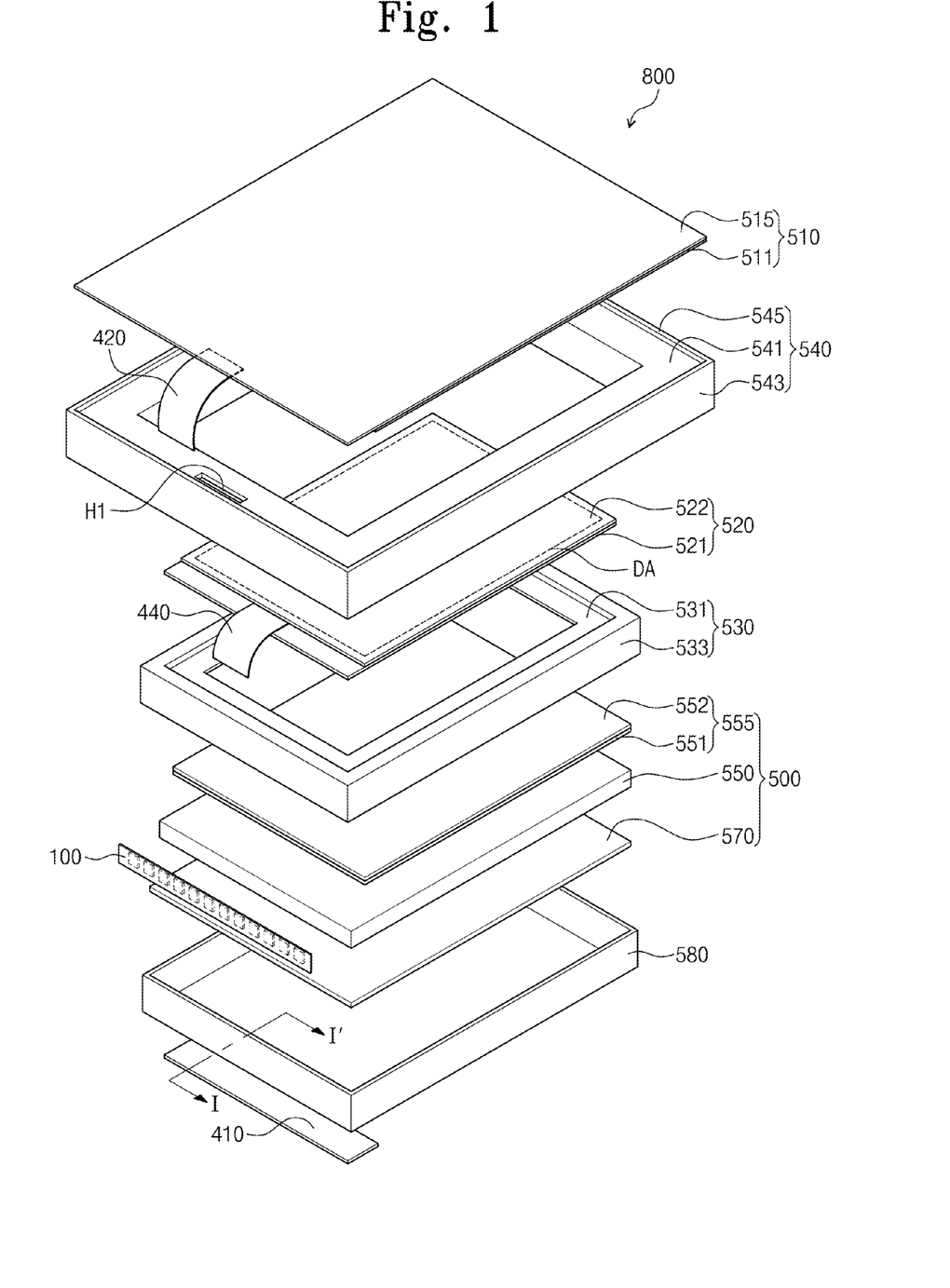
FIG. 1 is an exploded perspective view showing a display apparatus according to an exemplary embodiment of the present disclosure.
Figure 2A:
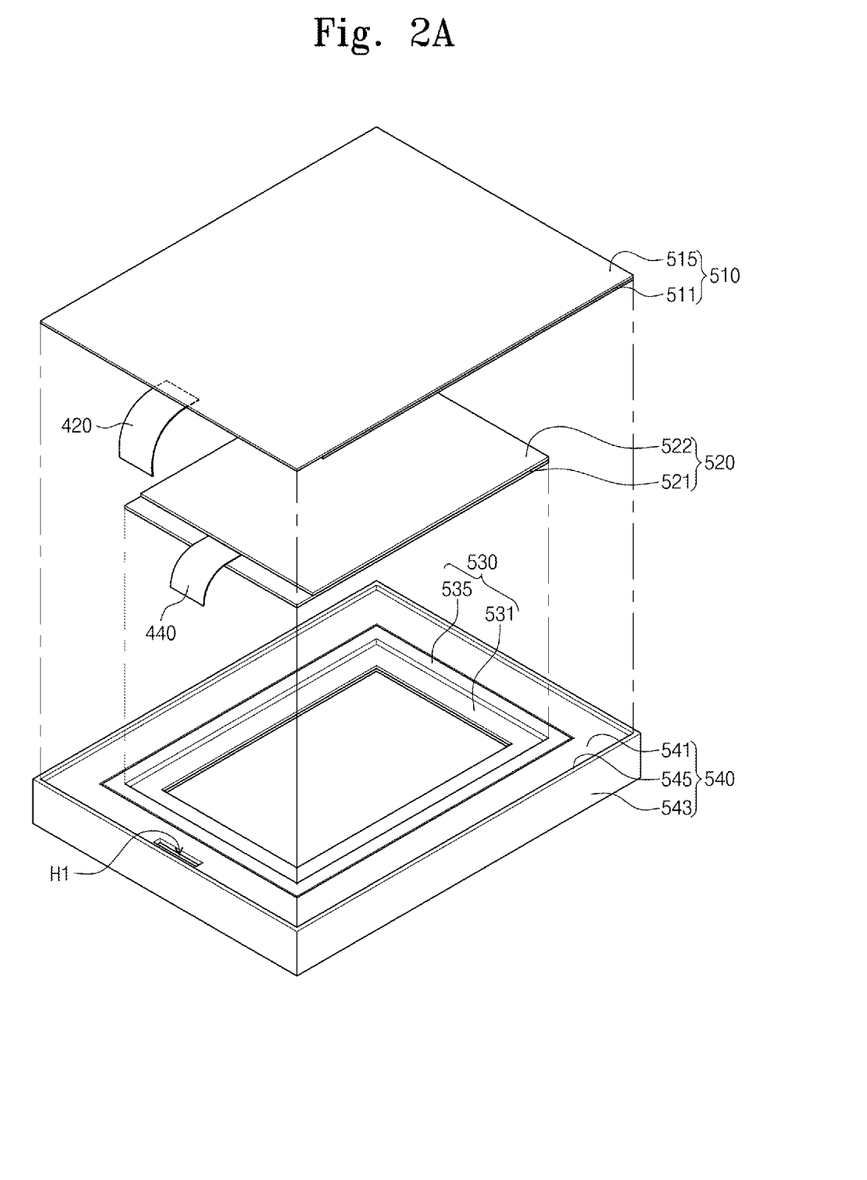
FIG. 2A is a perspective view showing a coupling state of a first mold frame, a second mold frame, a display panel, and a touch screen assembly of FIG. 1.

FIG. 1 is an exploded perspective view showing a display apparatus according to an exemplary embodiment of the present disclosure; FIG. 2A is a perspective view showing a coupling state of a first mold frame, a second mold frame, a display panel, and a touch screen assembly of FIG. 1; and FIG. 2B is a cross-sectional view taken along a line I-I' of FIG. 1.

Figure 2B:
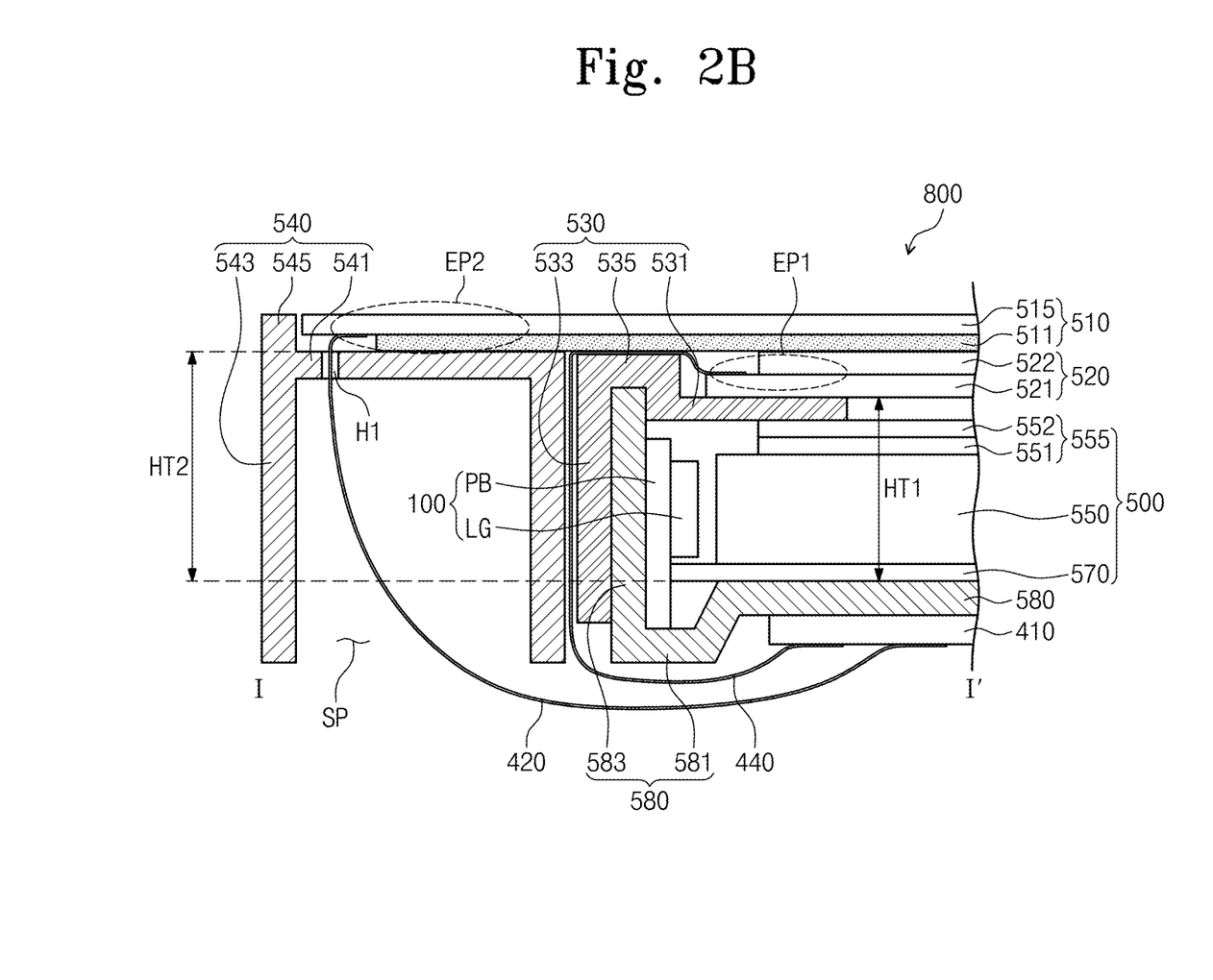
FIG. 2B is a cross-sectional view taken along a line I-I' of FIG. 1.

Referring to FIGS. 1, 2A, and 2B, a display apparatus 800 includes a display panel 520, a backlight assembly 500, a receiving container 580, a first mold frame 530, a second mold frame 540, a touch screen assembly 510, a first driving circuit film 420, a second driving circuit film 440, and a driving circuit board 410.

The display panel 520 includes a display area DA and receives light generated from the backlight assembly 500, so as to display an image in the display area DA. In the present exemplary embodiment, the display panel 520 may be, but not be limited to, a liquid crystal display panel. In this case, the display panel 520 includes a first substrate 521, a second substrate 522 facing the first substrate 521, and a liquid crystal layer (not shown) interposed between the first substrate 521 and the second substrate 522. Electrodes are disposed on the first and second substrates 521 and 522, and generate an electric field to control a direction of orientation of liquid crystal within the liquid crystal layer. However, the display panel 520 should not be limited to being a liquid crystal display panel. For instance, according to another exemplary embodiment, the display panel 520 may be any other type of display panel, such as an electrophoretic display panel, an electrowetting display panel, etc., and the electrodes may be disposed on either the first substrate 521 or the second substrate 522, or disposed on the first and second substrates 521 and 522 in a one-to-one correspondence relationship.

The backlight assembly 500 emits light used to display the image on the display panel 520. In the present exemplary embodiment, the backlight assembly 500 includes a light emitting unit 100, a reflection plate 570, a light guide plate 550, and optical sheets 555.

The light emitting unit 100 includes a printed circuit board PB and a plurality of light emitting diodes LG mounted on the printed circuit board PB to generate light. The printed circuit board PB is positioned to extend along one of side surfaces of the light guide plate 550, and the light emitting diodes LG are arranged along the printed circuit board PB. Thus, the light generated from the light emitting diodes LG falls incident to the light guide plate 550 through the proximate side surface of the light guide plate 550.

In the present exemplary embodiment, the light emitting unit 100 is disposed adjacent to one side surface of the light guide plate 550, however, the number and position of the light emitting units 100 should not be limited thereto or thereby. For instance, more than one light emitting unit 100 can be employed, and the light emitting units 100 can be disposed adjacent to other side surfaces of the light guide plate 550 as well.

The receiving container 580 includes a bottom portion 581 and a plurality of side walls 583 extended from the bottom portion 581, and elements of the backlight assembly 500 are contained inside the receiving container 580. In detail, the reflection plate 570, the light guide plate 550, and the optical sheets 555 are sequentially disposed on the bottom portion 581 of the receiving container 580.

The light guide plate 550 receives light generated by the light emitting unit 100, and guides the light to the display panel 520. In more detail, the light guide plate 550 receives light from the light emitting unit 100, and paths of the light traveling through the light guide plate 550 are changed by patterns (not shown), which have a concavo-convex shape and are arranged in or on a rear surface of the light guide plate 550, such that the light traveling through the light guide plate 550 is guided toward the display panel 520.

The reflection plate 570 includes a light reflecting material, such as polyethylene terephthalate (PET), aluminum, etc., and is disposed between the bottom portion 581 and the light guide plate 550. The reflection plate 570 reflects a portion of that light generated by the light emitting unit 100 back toward the light guide plate 550, thus increasing the amount of light provided to the light guide plate 550.

The optical sheets 555 are disposed between the display panel 520 and the light guide plate 550. In the present exemplary embodiment, the optical sheets 555 include a diffusion sheet 551 that diffuses the light exiting from the light guide plate 550 and a prism sheet 552 that condenses the light exiting from the diffusion sheet 551. In addition, end portions of the optical sheets 555 are inserted between a first supporting part 531 of the first mold frame 530 and the light guide plate 550.

The touch screen assembly 510 is disposed on the display panel 520. The touch screen assembly 510 includes a touch screen panel 515 and an adhesive layer 511.

The touch screen panel 515 detects a touch event occurring thereon. In the present exemplary embodiment, the touch screen panel 515 is operated in a capacitive mode, but it should not be limited to the capacitive mode. For instance, the touch screen panel 515 may be one that operates in a resistive film mode, an ultrasonic mode, an infrared mode, etc.

The adhesive layer 511 is disposed between the touch screen panel 515 and the display panel 520 to attach the touch screen panel 515 to the display panel 520. The adhesive layer 511 has a light transmitting property so as to transmit light, and the adhesive layer 511 may be, but not be limited to, an optically-clear adhesive (OCA) film.

In the present exemplary embodiment, the touch screen assembly 510 detects touch events in an area that is broader or larger than the display area DA. That is, the area that touches can be detected is larger than, and contains within, the display area DA. To this end, the touch screen panel 515 has a size greater than a size of the display panel 520 in order to detect touch events in an area broader than the display area DA. In this case, the display apparatus 800 requires an additional structure to support the touch screen panel 515 and the display panel 520.

As shown in FIG. 2A, in a case that the first mold frame 530 has a shape extending along side portions of the display panel 520, the second mold frame 540 has a shape to surround the first mold frame 530 and the first mold frame 530 is disposed inside the second mold frame 540 when viewed in a plan view. The first mold frame 530 includes a portion that supports the display panel 520, and the second mold frame 540 includes a portion that supports the touch screen assembly 510 when the first mold frame 530 and the second mold frame 540 are coupled to each other.

A structure of an end portion of each of the first and second mold frames 530 and 540 in a cross-sectional view will be described in detail with reference to FIG. 2B. The first mold frame 530 includes the first supporting part 531, a first partition wall 533, and an upper end part 535. The first supporting part 531 extends substantially in parallel with a first edge part EP1 of the display panel 520, and the first edge part EP1 is disposed on the first supporting part 531. Thus, the first edge part EP1 is supported by the first supporting part 531.

The upper end part 535 extends from the first supporting part 531 substantially parallel with each of the first edge part EP1 and the first supporting part 531. A side surface of the upper end part 535 faces the first edge part EP1 to prevent the first edge part EP1 from moving on the first supporting part 531 or from being separated from the first supporting part 531. That is, the side surface of the upper end part 535 keeps the first edge part EP1 from sliding off the first supporting part 531. In addition, the first partition wall 533 extends from the upper end part 535 in a direction away from the first supporting part 531 and the upper end part 535, and the first partition wall 533 is coupled to one of the side walls 583 of the receiving container 580.

The second mold frame 540 is spaced apart from the display panel 520 and arranged substantially in parallel with the first mold frame 530, and the second mold frame 540 supports a second edge part EP2 of the touch screen assembly 510. Particularly, the second mold frame 540 includes a second supporting part 541, second partition walls 543, and a step difference part 545. The second supporting part 541 extends substantially parallel to the upper end part 535 and the second edge part EP2, and the second edge part EP2 is disposed on the second supporting part 541, so that the second edge part EP2 is supported by the second supporting part 541.

A first height HT1 between the bottom portion 581 and the first supporting part 531 is smaller than a second height HT2 between the bottom portion 581 and the second supporting part 541. In addition, a height between the bottom portion 581 and the upper end part 535 is substantially the same as the second height HT2. Thus, the touch screen assembly 510 disposed on the upper end part 535 and the second supporting part 541 is maintained in a substantially horizontal position.

The second partition walls 543 extend from both ends of the second supporting part 541 in a direction away from the second supporting part 541, and face the first partition wall 533 of the first mold frame 530. In addition, the step difference part 545 is disposed on one end of the second supporting part 541. The step difference part 545 extends in a direction that is substantially perpendicular to the second supporting part 541, and thus the step difference part 545 faces a side surface of the second edge part EP2. As a result, the step difference part 545 prevents the second edge part EP2 from being outwardly separated from, or sliding off, the second supporting part 541.

An end of the first driving circuit film 420 is electrically connected to a terminal (not shown) of the touch screen panel 515, and the other end of the first driving circuit film 420 is electrically connected to a terminal (not shown) of the driving circuit board 410. The driving circuit board 410 generates a driving signal to drive the touch screen panel 515, and the driving signal is applied to the touch screen panel 515 through the first driving circuit film 420.

In the present exemplary embodiment, the driving circuit board 410 includes a driving chip (not shown) that generates the driving signal, however, a structure of the driving circuit board 410 and the first driving circuit film 420 should not be limited thereto or thereby. For instance, the driving chip may be mounted on the first driving circuit film 420 in a chip-on-film (COF) structure.

In addition, a first insertion hole H1 is formed penetrating through the second supporting part 541, and a width of the first insertion hole H1 is greater than a width of the first driving circuit film 420. Thus, when a containing space SP is defined by the second partition walls 543 and the second supporting part 541 in the second mold frame 540, a portion of the first driving circuit film 420 is contained in the containing space SP after passing through the first insertion hole H1.

In the present exemplary embodiment, the first driving circuit film 420 has a flexibility similar to a flexible printed circuit board, and the first driving circuit film 420 includes a bent portion bent from the terminal of the touch screen panel 515 toward the terminal of the driving circuit board 410. Then, the bent portion of the driving circuit film 420 is contained in the containing space SP.

One of ordinary skill in the art will observe that the two above-described mold frames are configured so that upper surfaces of each respectively support the display panel and touch screen assembly. In particular, the first mold frame supports the display panel but not the touch screen assembly, while the second mold frame supports the touch screen assembly but not the display panel. This allows one frame assembly to support a display panel and touch screen that are of different sizes, which in turn allows the display panel and touch screen to be made to their own size specifications, rather than being forced to both be the same size, or to be of less-optimal sizes.

According to another exemplary embodiment, other elements of the display apparatus 800 may be contained in the containing space SP in addition to the first driving circuit film 420. For instance, the driving circuit board 410 is disposed at a lower portion of the receiving container 580 in the present exemplary embodiment, but the driving circuit board 410 may be contained in the containing space SP. As described above, since the containing space SP is used to contain elements of the display apparatus 800, a size of the display apparatus 800 may be reduced.

An end of the second driving circuit film 440 is electrically connected to a terminal (not shown) of the display panel 520, and the other end of the second driving circuit film 440 is electrically connected to a terminal (not shown) of the driving circuit board 410. The driving circuit board 410 generates a driving signal to drive the display panel 520, and the driving signal is applied to the display panel 520 through the second driving circuit film 440.

In the present exemplary embodiment, the second driving circuit film 440 has a flexibility similar to the flexible printed circuit board, and the second driving circuit film 440 extends from the display panel 520 to the driving circuit board 410 after passing through a space between the first mold frame 530 and the second mold frame 540.

Figure 3:
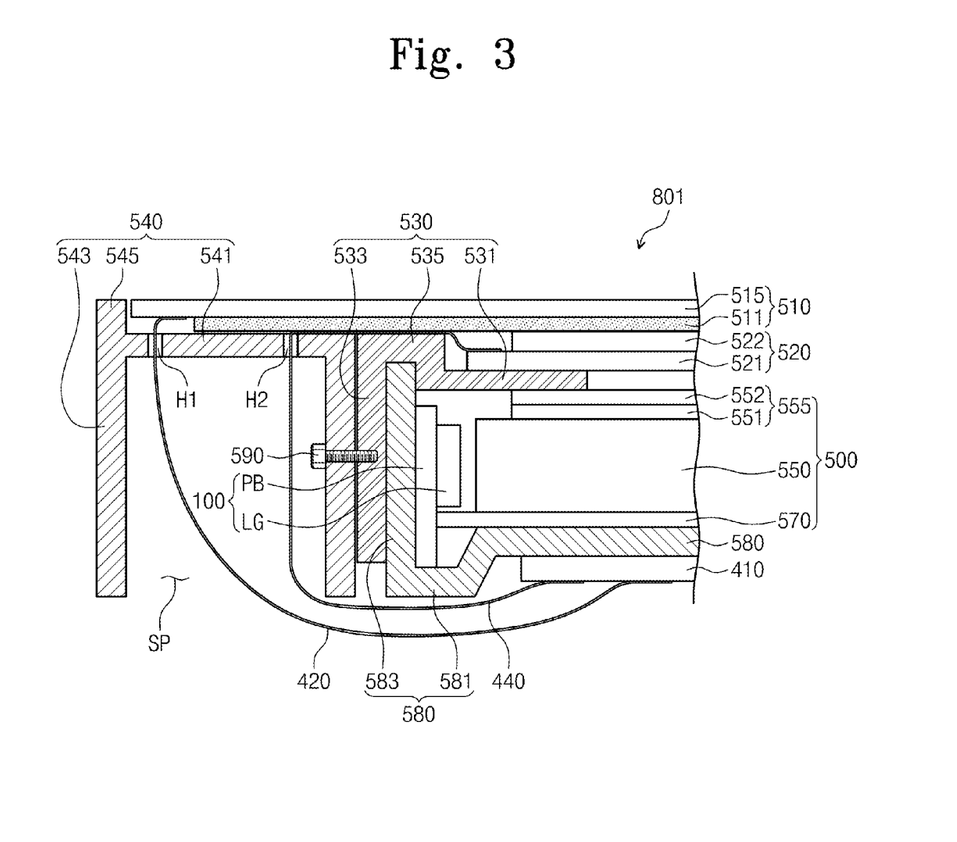
FIG. 3 is a cross-sectional view showing a display apparatus according to an other exemplary embodiment of the present invention.

FIG. 3 is a cross-sectional view showing a display apparatus according to another exemplary embodiment of the present invention. In FIG. 3, the same reference numerals denote the same elements in FIG. 2B, and thus a detailed descriptions of the same elements will be omitted.

Referring to FIG. 3, a display apparatus 801 further includes a coupling member 590, and a second mold frame 540 is coupled to a first mold frame 530 by the coupling member 590. The coupling member 590 may be, but is not limited to, a screw, and one of the second partition walls 543 of the second mold frame 540, which is adjacent to a first partition wall 533 of the first mold frame 530, is coupled to the first partition wall 533 by the coupling member 590.

Thus, the second mold frame 540 is fixed to the first mold frame 530 by the coupling member 590. As a result, even though the second mold frame 540 is formed relatively thin or the second mold frame 540 is formed of a plastic material having a smaller rigidity than that of a metal material, the second mold frame 540 is kept from being bent by stresses applied thereon from an exterior force, thereby stably supporting a touch screen assembly 510.

In the present exemplary embodiment, a second insertion hole H2 is formed penetrating through the second supporting part 541, and a width of the second insertion hole H2 is greater than a width of a second driving circuit film 440. Thus, a portion of the second driving circuit film 440 is contained within a containing space SP after passing through the second insertion hole H2.

In the present exemplary embodiment, the second driving circuit film 440 includes a bent portion bent from a terminal of a touch screen panel 515 toward a terminal of a driving circuit board 410, and the bent portion of the second driving circuit film 440 is contained within the containing space SP.

Figure 4:
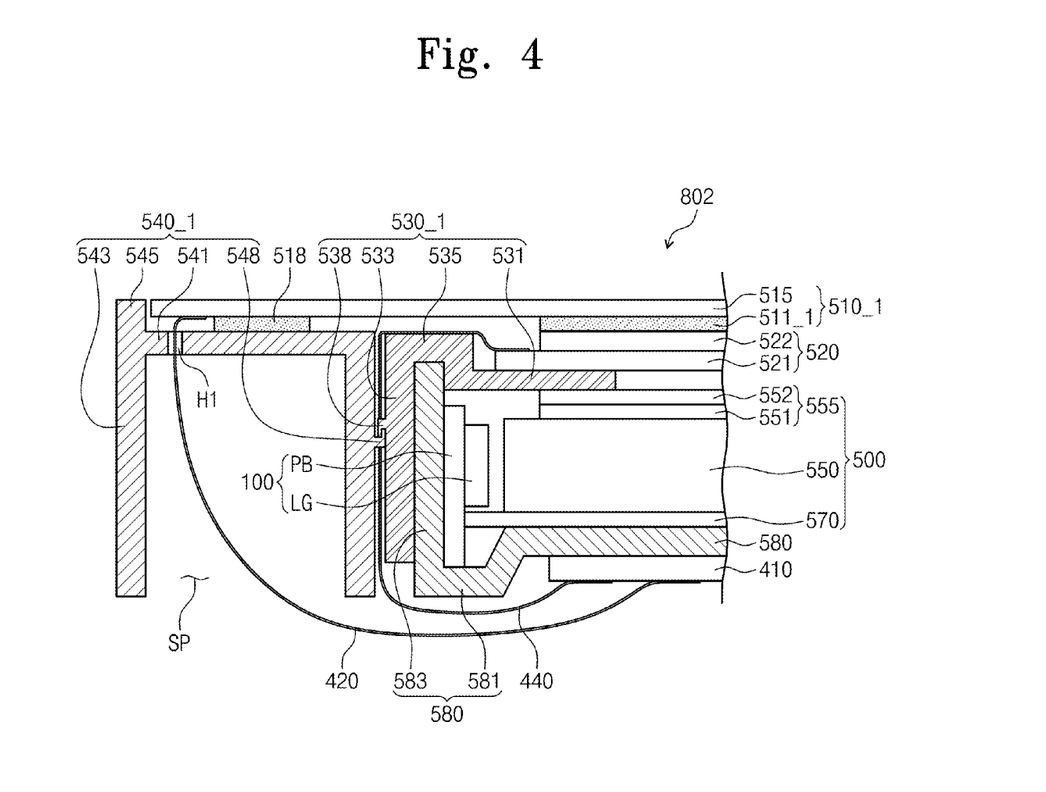
FIG. 4 is a cross-sectional view showing a display apparatus according to another exemplary embodiment of the present invention.

FIG. 4 is a cross-sectional view showing a display apparatus according to another exemplary embodiment of the present invention. In FIG. 4, the same reference numerals denote the same elements in FIGS. 2B and 3, and thus a detailed description of the same elements will be omitted.

Referring to FIG. 4, a first mold frame 530_1 of a display apparatus 802 includes a first supporting part 531, a first partition wall 533, an upper end part 535, and a first coupling part 538, and a second mold frame 540_1 of the display apparatus 802 includes a second supporting part 541, a second partition wall 543, a step difference part 545, and a second coupling part 548. The second coupling part 548 is coupled to the first coupling part 538 to fix the second mold frame 540_1 to the first mold frame 530_1.

In the present exemplary embodiment, the first and second coupling parts 538 and 548 may be, but are not limited to, hooks having symmetrical shapes with respect to each other, but the shapes of the first and second coupling parts 538 and 548 should not be limited thereto or thereby. For instance, the first coupling part 538 may be a convex portion, and the second coupling part 548 may be a concave portion to accommodate the convex portion.

In addition, the display apparatus 802 further includes an adhesive member 518. The adhesive member 518 is disposed on the second supporting part 541 to attach a second edge part EP2 (corresponding to the portion shown in FIG. 2) to the second supporting part 541. In this case, an adhesive layer 511_1 of a touch screen assembly 510_1, which has a light transmitting property, is provided in an area where the display panel 520 is disposed between the touch screen panel 515 and the first supporting part 531.

In the present exemplary embodiment, the adhesive member 518 may be an adhesive tape or may be formed by curing an adhesive material.

Figure 5:
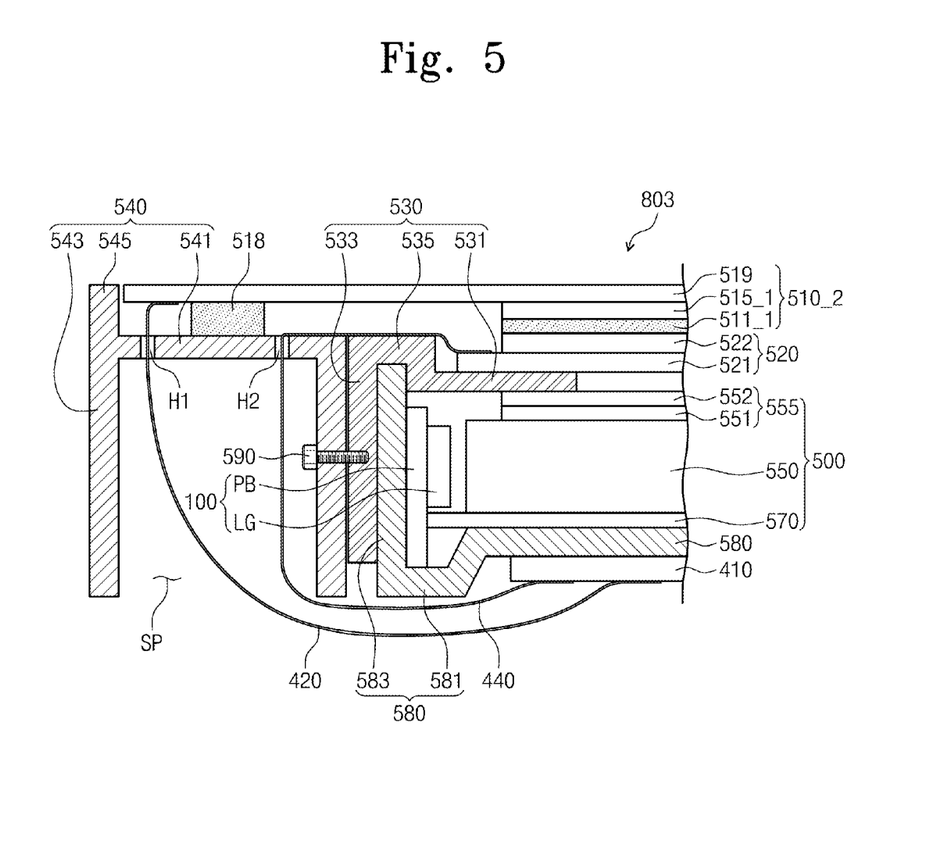
FIG. 5 is a cross-sectional view showing a display apparatus according to another exemplary embodiment of the present invention.

FIG. 5 is a cross-sectional view showing a display apparatus according to another exemplary embodiment of the present invention. In FIG. 5, the same reference numerals denote the same elements in FIGS. 2B, 3, and 4, and thus any detailed descriptions of the same elements will be omitted.

Referring to FIG. 5, a touch screen assembly 510_2 of a display apparatus 803 includes a touch screen panel 515_1, an adhesive layer 511_1, and a covering member 519. The covering member 519 is disposed on the touch screen panel 515_1 to face a display panel 520 while interposing the touch screen panel 515_1 therebetween. The covering member 519 may be, but is not limited to, a transparent substrate, such as a tempered glass, and the covering member 519 covers the touch screen panel 515_1.

In the present exemplary embodiment, the touch screen panel 515_1 has substantially the same size as the display panel 520, and thus edge portions of each of the touch screen panel 515_1 and the display panel 520 are both disposed on a first supporting part 531. In addition, the covering member 519 has a size greater than that of each of the touch screen panel 515_1 and the display panel 520, and thus edge portions of the covering member 519, which do not overlap the display panel 520 and the touch screen panel 515_1 but rather extend beyond and thereover, are disposed on a second supporting part 541.

Figure 6:
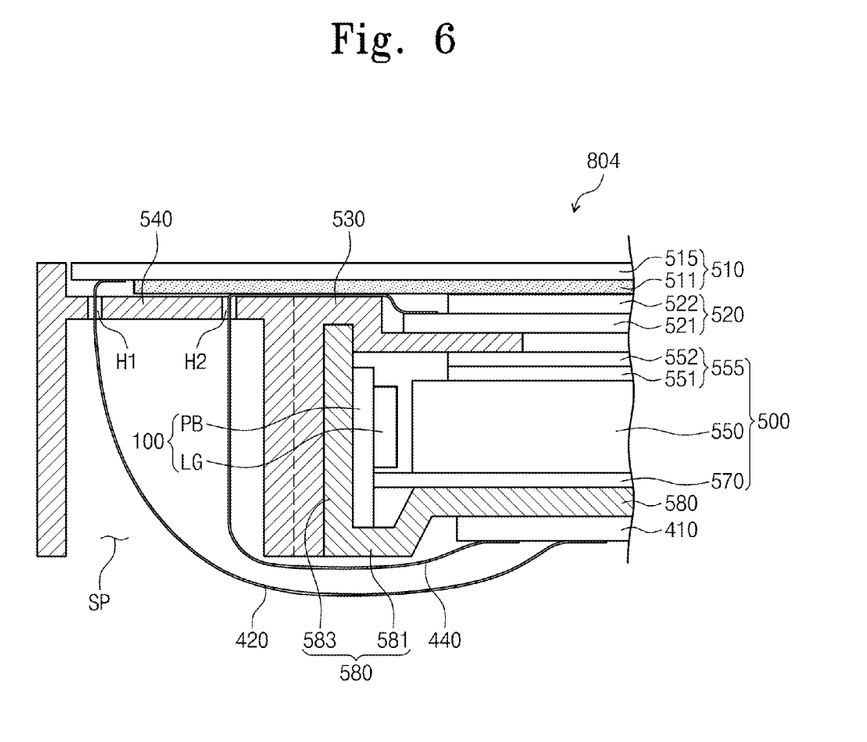
FIG. 6 is a cross-sectional view showing a display apparatus according to another exemplary embodiment of the present invention.

FIG. 6 is a cross-sectional view showing a display apparatus according to another exemplary embodiment of the present invention. In FIG. 6, the same reference numerals denote the same elements in FIGS. 2B, 3, 4, and 5, and thus any detailed descriptions of the same elements will be omitted.

Referring to FIG. 6, a display apparatus 804 includes a first mold frame 530 and a second mold frame 540, and the first and second mold frames 530 and 540 are integrally formed, i.e. two portions of a single unitary structure. Thus, an assembling process of elements in the display apparatus 804 may be simplified using the first and second mold frames 530 and 540. In addition, a rigidity of the first and second mold frames 530 and 540 may be enhanced, and thus a touch screen assembly 510 and a display panel 520 are more stably supported by the first and second mold frames 530 and 540.

In the present exemplary embodiment, the first and second mold frames 530 and 540 are formed of a metal or plastic material. In this case, the first and second mold frames 530 and 540 are manufactured by an extrusion molding method.

Figure 7:
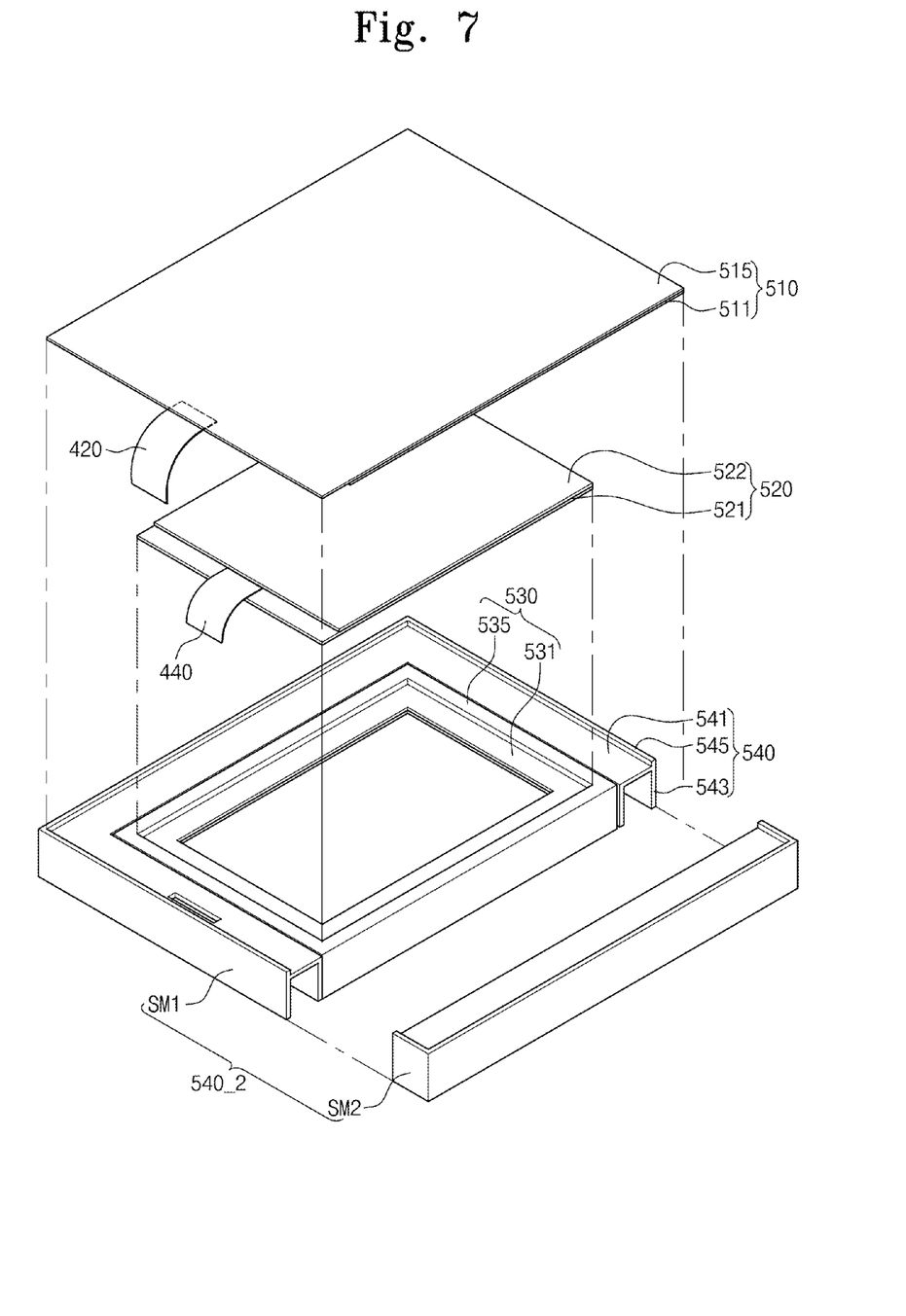
FIG. 7 is a perspective view showing a coupling state of a first mold frame, a second mold frame, a display panel, and a touch screen assembly of a display apparatus according to another exemplary embodiment of the present invention.

FIG. 7 is a perspective view showing a coupling state of a first mold frame, a second mold frame, a display panel, and a touch screen assembly of a display apparatus according to another exemplary embodiment of the present invention. In FIG. 7, the same reference numerals denote the same elements in FIG. 2A, and thus a detailed descriptions of the same elements will be omitted.

Referring to FIG. 7, a second mold frame 540_2 of a display apparatus includes a first sub-mold frame SM1 and a second sub-mold frame SM2. In the present exemplary embodiment, the first sub-mold frame SM1 is extended along three sides among the four sides of the display panel 520, and the second sub-mold frame SM2 is extended along the remaining side.

The first sub-mold frame SM1 and the second sub-mold frame SM2 are either coupled to or separated from each other. For instance, the first and second sub-mold frames SM1 and SM2 may be coupled to or separated from each other using a screw.

As described above, when the first and second sub-mold frames SM1 and SM2 are easily coupled to or separated from each other, the assembling process becomes easier.

Meanwhile, in the present exemplary embodiment, the second mold frame 530_2 is configured to include two parts, e.g., the first and second sub-mold frames SM1 and SM2. Alternatively, the second mold frame 530_2 may be configured to include three or more sub-mold frames extended along any edges or portions thereof.

Although certain exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A display apparatus comprising:
   a receiving container comprising a bottom portion and side walls that extend from the bottom portion;
   a backlight assembly positioned within the receiving container and configured to generate a light;
   a display panel positioned to receive the light from the backlight assembly so as to display an image;
   a touch screen assembly disposed on the display panel and configured to detect a touch event occurring thereon, the touch screen assembly having a lower surface facing the bottom portion of the receiving container;
   a first mold frame coupled to the receiving container to support a first edge part of the display panel; and
   a second mold frame spaced apart from the display panel and coupled to the first mold frame so as to be configured to support a second edge part of the touch screen assembly;
   wherein a portion of the first mold frame is substantially coplanar with the portion of the second mold frame that faces the lower surface of the touch screen assembly and supports the second edge part of the touch screen assembly.

2. The display apparatus of claim 1, wherein the first mold frame has at least a portion disposed within outer edges of the second mold frame.

3. The display apparatus of claim 2, wherein the second mold frame surrounds outer edges of the first mold frame.

4. The display apparatus of claim 3, wherein the second mold frame comprises at least two sub-mold frames configured to be coupled to each other.

5. The display apparatus of claim 1,
wherein the first mold frame comprises a first supporting part oriented substantially parallel to the first edge part, and positioned so that the first edge part is supported by the first supporting part,
wherein the second mold frame comprises:
   a second supporting part oriented substantially parallel to the second edge part; and
   partition walls extending from the second supporting part, wherein the second edge part is supported by the second supporting part, and a height difference between the bottom portion and the second supporting part is greater than a height difference between the bottom portion and the first supporting part.

6. The display apparatus of claim 5, wherein the first mold frame further comprises an upper end part extending from the first supporting part and oriented substantially parallel to the first edge part and the first supporting part, and wherein the height difference between the bottom portion and the second supporting part is substantially equal to a height difference between the bottom portion and the upper end part.

7. The display apparatus of claim 5, further comprising a coupling member that couples at least one of the partition walls to the first mold frame.

8. The display apparatus of claim 5, further comprising an adhesive member disposed on the second supporting part to attach the second edge part to the second supporting part.

9. The display apparatus of claim 5, further comprising:
   a driving circuit film of which one end portion is electrically connected to the touch screen assembly so as to be configured to apply a driving signal to the touch screen assembly; and
   a driving circuit board facing the touch screen assembly with the receiving container interposed therebetween, the driving circuit board configured to generate the driving signal and further being electrically connected to the other end portion of the driving circuit film,
   wherein a containing space is defined by the partition walls and the second supporting part inside the second mold frame, and a portion of the driving circuit film is contained in the containing space while extending through an insertion hole formed through the second supporting part.

10. The display apparatus of claim 5, further comprising:
   a driving circuit film of which one end portion is electrically connected to a terminal of the display panel so as to be configured to apply a driving signal to the display panel;
   a driving circuit board facing the display panel with the receiving container interposed therebetween, the driving circuit configured to generate the driving signal and further being electrically connected to the other end portion of the driving circuit film,
   wherein a containing space is defined by the partition walls and the second supporting part inside the second mold frame, and a portion of the driving circuit film is contained in the containing space while extending through an insertion hole formed through the second supporting part.

11. The display apparatus of claim 5, further comprising:
   a driving circuit film of which one end portion is electrically connected to a terminal of the display panel so as to be configured to apply a driving signal to the display panel; and
   a driving circuit board facing the display panel with the receiving container interposed therebetween, the driving circuit configured to generate the driving signal and further being electrically connected to the other end portion of the driving circuit film,
   wherein the driving circuit film extends from the display panel to the driving circuit board while extending through a space between the first mold frame and the second mold frame.

12. The display apparatus of claim 5, wherein the second mold frame further comprises a step difference part disposed on the second supporting part to face a side surface of the second edge part.

13. The display apparatus of claim 5, wherein the touch screen assembly comprises:
   a touch screen panel disposed on the display panel; and
   an adhesive layer disposed between the touch screen panel and the display panel to attach the touch screen panel to the display panel, wherein the touch screen panel has a size greater than the display panel, and an area of the touch screen panel that extends beyond an edge of the display panel is supported by the second supporting part.

14. The display apparatus of claim 5, wherein the touch screen assembly comprises:
   a touch screen panel disposed on the display panel;
   an adhesive layer disposed between the touch screen panel and the display panel to attach the touch screen panel to the display panel; and
   a covering member disposed on the touch screen panel and facing the display panel with the touch screen panel interposed therebetween so that the covering member covers the touch screen panel, the covering member having a size greater than the display panel and the touch screen panel, and an area of the covering member that extends beyond edges of the display panel and the touch screen panel is supported by the second supporting part.

15. The display apparatus of claim 1, wherein the first edge part is exposed to an exterior of the display apparatus.

16. The display apparatus of claim 1, wherein the first mold frame and the second mold frame are portions of a single unitary structure.

* * * * *